(12) United States Patent
Robinson et al.

(10) Patent No.: US 6,783,719 B2
(45) Date of Patent: Aug. 31, 2004

(54) MOLD WITH METAL OXIDE SURFACE COMPATIBLE WITH IONIC RELEASE AGENTS

(75) Inventors: Timothy R. Robinson, Lake Forest Park, WA (US); Shubang Gan, Bothell, WA (US); Stephen H. Humphrey, Seattle, WA (US)

(73) Assignee: Korry Electronics, Co., Seattle, WA (US)

( * ) Notice: Subject to any disclaimer, the term of this patent is extended or adjusted under 35 U.S.C. 154(b) by 408 days.

(21) Appl. No.: 09/785,667

(22) Filed: Feb. 16, 2001

(65) Prior Publication Data

US 2002/0135099 A1 Sep. 26, 2002

Related U.S. Application Data

(63) Continuation-in-part of application No. 09/769,014, filed on Jan. 19, 2001, now abandoned.

(51) Int. Cl.[7] .......................... B29C 33/56; B29D 11/00
(52) U.S. Cl. .................... 264/300; 264/338; 264/2.5; 427/133; 427/162
(58) Field of Search .................. 264/25, 240, 338, 264/300; 427/457, 133, 162, 585; 425/810

(56) References Cited

U.S. PATENT DOCUMENTS

| | | |
|---|---|---|
| 3,126,294 A | 3/1964 | Pichler |
| 3,506,556 A | 4/1970 | Gillery et al. |
| 3,629,388 A | 12/1971 | Wolf et al. |
| 3,808,077 A | 4/1974 | Rieser et al. |
| 3,925,530 A | 12/1975 | Rees |
| 3,931,381 A | 1/1976 | Lindberg |
| 3,993,620 A | 11/1976 | Yamanishi et al. |
| 4,102,954 A | 7/1978 | Coale |
| 4,118,235 A | 10/1978 | Horiuchi et al. |

(List continued on next page.)

FOREIGN PATENT DOCUMENTS

EP  307 561  * 3/1989

OTHER PUBLICATIONS

Asher, William E., "Epoxy Replication—Advantages and Limitations, " in Max J. Riedl (ed.), "Replication adn Molding of Optical Components," *Proceedings of the International Society for Optical Engineering*, vol. 896, Los Angeles, Calif., Jan. 13–14, 1988, pp. 2–18.

Berg, John C. (ed.), *Wettability*, vol. 49, Surfactant Science Series, Marcel Dekker, Inc., New York, 1993, pp. 98–107.

Billmeyer, Fred W., Jr., *Textbook of Polymer Science*, 3d ed., John Wiley & Sons, New York, 1984, p. 465.

Bohling, David A., et al., "A Look at Lenses," *Vacuum & Thinfilm*, Nov./Dec. 1998, pp. 22–28.

(List continued on next page.)

*Primary Examiner*—Mathieu D. Vargot
(74) *Attorney, Agent, or Firm*—Christensen O'Connor Johnson Kindness

(57) ABSTRACT

A method and a system for fabricating articles made from thermoset resins using an ionic mold release agent. The invention uses a mold having a metal oxide surface with enhanced mold release characteristics. The release agent is applied internally in the resin composition or externally on the metal oxide surface. The method includes providing a mold, forming a metal oxide surface on the mold, providing an ionic release agent, providing the acid or base conjugate of the release agent at the metal oxide surface, providing a thermoset resin in the mold, and curing the resin in the mold. A method of using float glass having a $SnO_2$ enriched surface, wherein the method includes the steps of providing an ionic release agent externally to the tin oxide surface, is also disclosed.

36 Claims, 8 Drawing Sheets

U.S. PATENT DOCUMENTS

| | | | |
|---|---|---|---|
| 4,131,662 | A | 12/1978 | Cekoric et al. |
| 4,183,843 | A | 1/1980 | Koenig |
| 4,230,758 | A | 10/1980 | Nagai et al. |
| 4,263,350 | A | 4/1981 | Valimont |
| 4,518,031 | A | 5/1985 | Yamanishi et al. |
| 4,671,838 | A | 6/1987 | Bravet et al. |
| 4,775,554 | A | 10/1988 | Ponjee |
| 4,791,185 | A | 12/1988 | Kanemura et al. |
| 4,887,791 | A | 12/1989 | Tangari et al. |
| 4,983,566 | A | 1/1991 | Wieserman et al. |
| 5,039,435 | A | 8/1991 | Hanano |
| 5,102,507 | A | 4/1992 | Wieserman et al. |
| 5,126,209 | A | 6/1992 | Kruger |
| 5,132,181 | A | 7/1992 | Wefers et al. |
| 5,143,750 | A | 9/1992 | Yamagata et al. |
| 5,204,126 | A | 4/1993 | Singh et al. |
| 5,223,350 | A | 6/1993 | Kobayashi et al. |
| 5,277,788 | A | 1/1994 | Nitowski et al. |
| 5,277,831 | A | 1/1994 | Hanano |
| 5,531,841 | A | 7/1996 | O'Melia et al. |
| 5,614,581 | A | 3/1997 | Cobbledick et al. |
| 5,753,730 | A | 5/1998 | Nagata et al. |
| 5,776,265 | A | 7/1998 | Kramer et al. |
| 5,804,674 | A | 9/1998 | Yamana et al. |
| 5,827,567 | A | 10/1998 | Molitor |
| 5,876,801 | A | 3/1999 | Ogawa et al. |
| 5,897,918 | A | 4/1999 | Singh et al. |
| 5,962,561 | A | 10/1999 | Turshani et al. |
| 6,117,495 | A | 9/2000 | Hanson et al. |
| 6,299,983 | B1 | 10/2001 | Van Alsten |

OTHER PUBLICATIONS

"Cast Resin Department," *Fosta–Tek Optics: Engineered Optical Plastics*, n.d., <http://www.fostatek.thomasregister.com/olc/fostatek/cast.htm> (Oct. 31, 2000).

Hicks, Clark T., "Casting of Film," in Modern Plastics (ed.), *Plastics Handbook*, McGraw Hill, 1994, pp. 147–148.

*Nightshield® Night–Vision Filters* brochure, Korry Electronics Co., Seattle, Wash., 1996, 4 pages.

Woods, George, *The ICI Polyurethanes Book*, 2d ed., Polyurethanes and John Wiley & Sons, New York, 1990, pp. 101–117.

Woods, George, *The ICI Polyurethanes Book*, 2d ed., Polyurethanes and John Wiley & Sons, New York, 1990, pp. 182–187.

Wu, Souheng, *Polymer Interface and Adhesion*, Marcel Dekker, Inc., New York, 1982, pp. 600–603.

Bolger, J.C., and S. Michaels, "Molecular Structure and Electrostatic Instructions at Polymer–Solid Interfaces," in P. Weiss and G.D. Cheever (eds.), *Interface Conversion for Polymer Coatings*, Elsevier, New York, 1969, pp. 4–59.

Choi, J.Y., et al., "Properties of Cadmium Sulfide Thin Films Deposited by Chemical Bath Deposition With Ultrasonication," *Solar Energy* 64(1–3):41–47, Sep. 1998.

Dezhkunov, N.V., and P.P. Prokhorenko, "Action of Ultrasound on the Rise of a Liquid in a Capillary Tube and its Dependence on the Properties of the Liquid," *Journal of Engineering Physics* 5:1014–1019, 1981.

Suslick, K.S., and G.J. Price, "Applications of Ultrasound to Materials Chemistry," *Annu. Rev. Mater. Sci.* 29:295–326, 1999.

\* cited by examiner

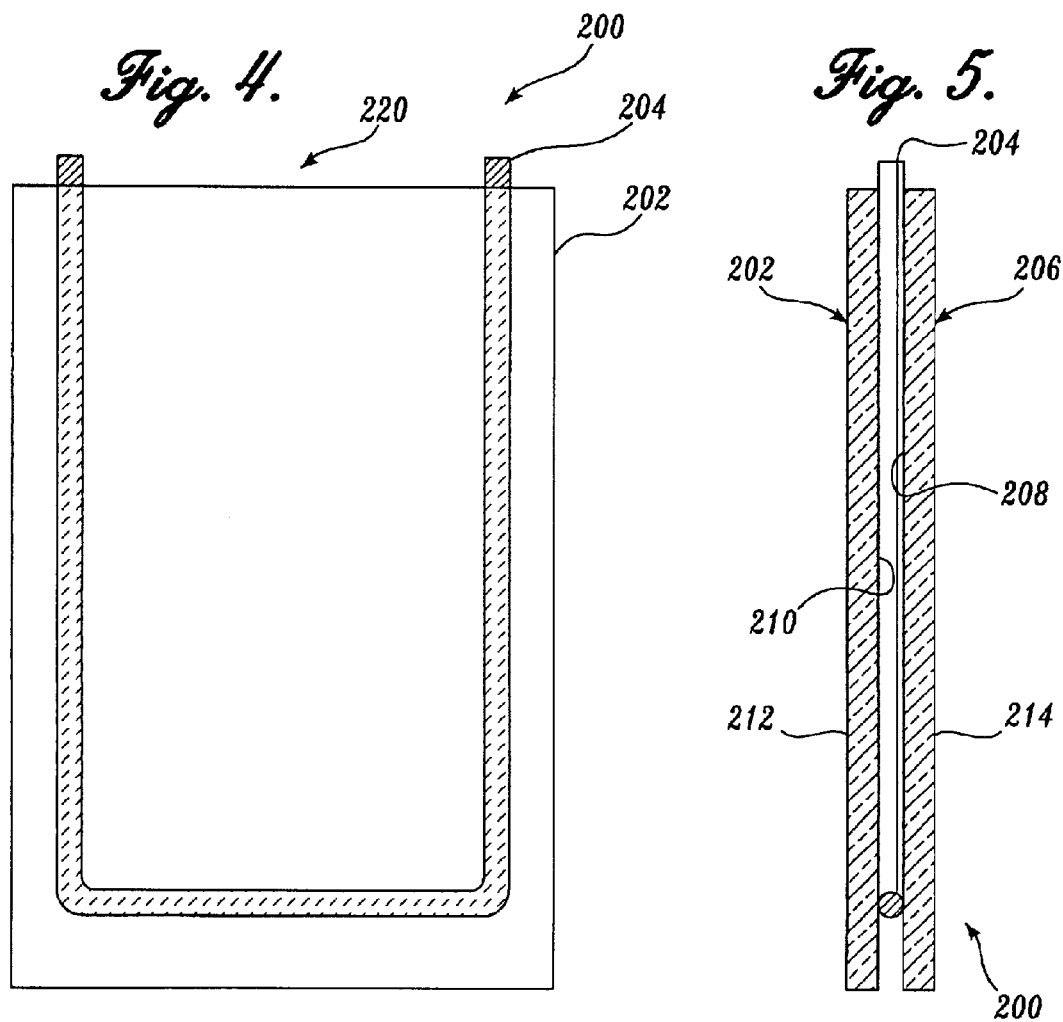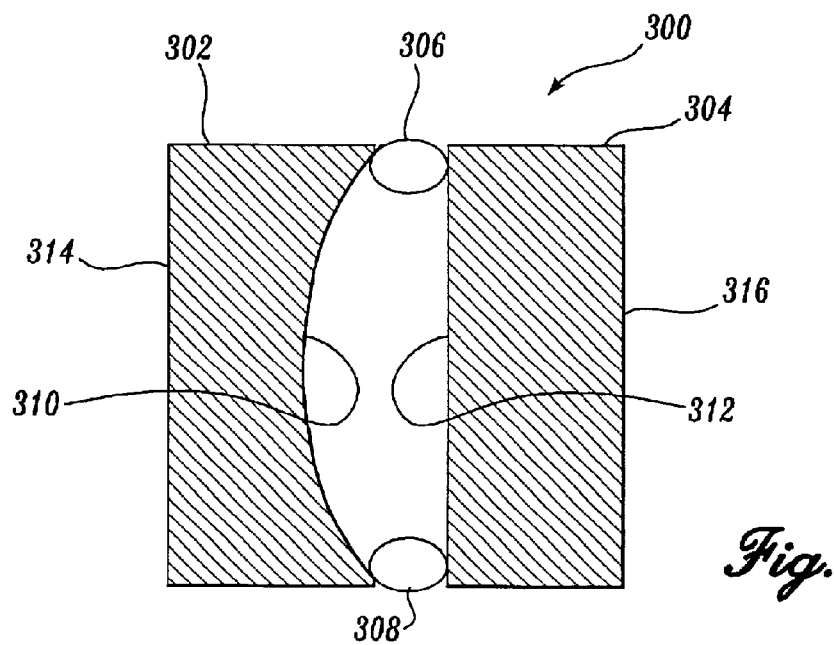

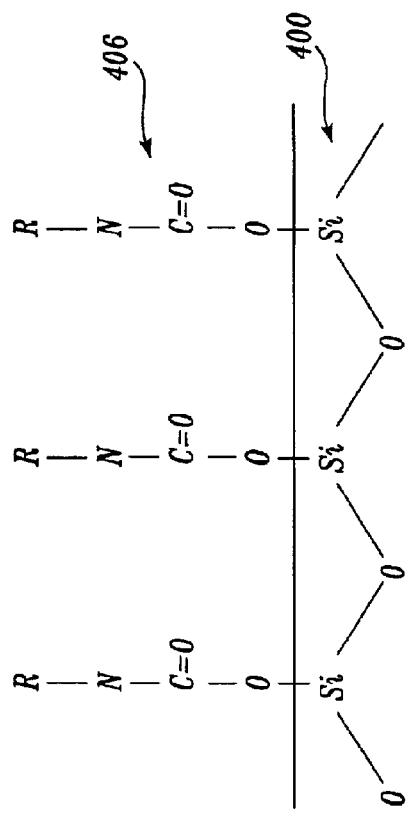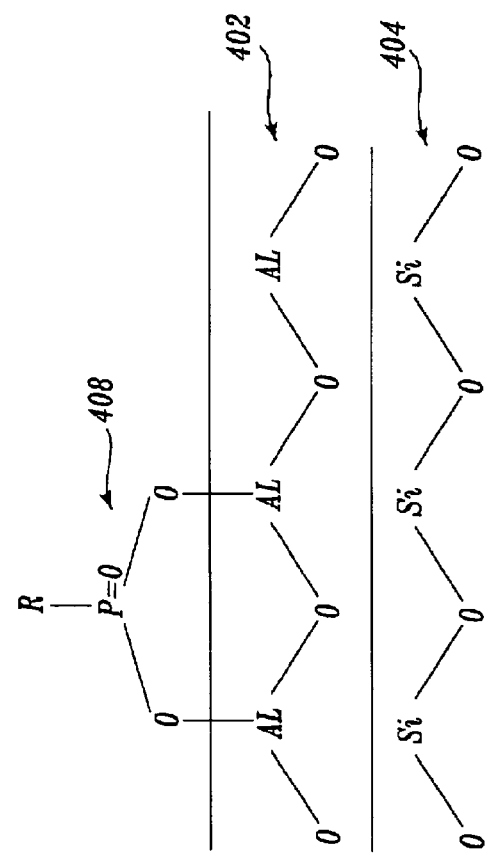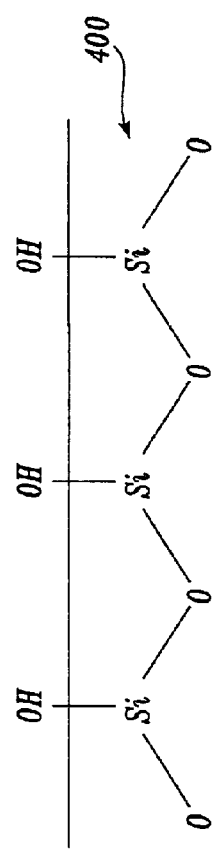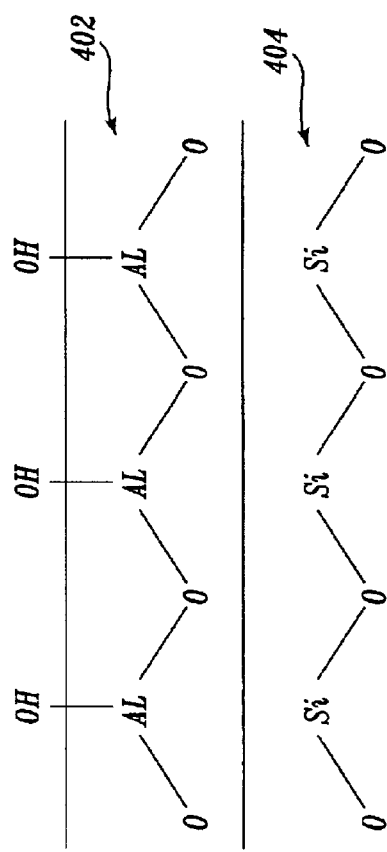
Fig. 11.
Fig. 12.
Fig. 9.
Fig. 10.

MOLD WITH METAL OXIDE SURFACE COMPATIBLE WITH IONIC RELEASE AGENTS

CROSS-REFERENCE TO RELATED APPLICATION

This application is a continuation-in-part of U.S. patent application Ser. No. 09/769,014, filed Jan. 19, 2001, now abandoned.

FIELD OF THE INVENTION

The present invention relates to the field of molding thermoset compositions, and more particularly, to a method and system for a mold to improve the properties of release agents.

BACKGROUND OF THE INVENTION

Applications for optical urethane resins have grown over the past fifteen years. The main reason for this growth results from the ability to tailor the resin formulation to impart a wide range of properties such as high glass transition temperature, chemical resistance, high light transmission, high refractive index, and low casting shrinkage. In addition, the urethane reactants can be selected to be compatible with a wide range of specialty additives.

Thermosetting urethanes are generally produced by cell-casting techniques. Organic resin materials are mixed until a uniform solution is obtained. The uniform mixture is then poured into a cell (or a mold), placed in an oven and cured at elevated temperatures. After the cure cycle, the mold is opened and the resulting plastic material is separated from the mold.

For optical applications, it is common to use glass as the casting surface. For casting large area, flat plastic sheets, float glass provides the necessary optical surface finish at an economical price. The casting process replicates the smooth optical finish of the glass mold surface. Unfortunately, urethane resins tenaciously adhere to silicate glass surfaces. Such adhesion damages the plastic material and glass inserts during the plastic/glass separation process. As a result, a mold release agent is typically used to inhibit adhesion between the urethane resin and the glass surface. To date, there have been various methods and materials to serve as the releasing agent. One broad class of releasing agent are silicones or other oils. These oils are applied to the glass surface as lubricating agents to provide a single casting release to the urethane. These materials have several drawbacks. Since these oils do not bond to the glass, they must be reapplied to the glass surface prior to each casting. The uniform application of these oils tends to be an art form and dependent upon the skill level of the individual operator. As a result, the release properties are inconsistent. In addition, the oil contaminants can be transferred to the plastic material thereby compromising the adhesion of thin films deposited onto the cast urethane sheet. Furthermore, certain oils can leave a hard to clean residue on the mold surface that can damage the optical surface finish of the mold after multiple castings. Both the number of surface defects and the cost of cleaning the mold surface increases with silicone oil residue buildup on the glass surfaces. Finally, if the mold surface has three dimensional features, such as prisms or lenses, the silicone oils can disrupt the sharp features necessary for the desired refractive or diffractive property.

Semi-permanent mold releases address some of the drawbacks described above. U.S. Pat. No. 5,204,126, assigned to the Nanofilm Corporation, describes a mold release for optical casting applications that uses a siloxane based, film forming amphiphilic molecule. U.S. Pat. No. 5,804,674, assigned to Daikin Industries, describes the application of a multicomponent film forming compound including silanes (for example, fluorinated trialkoxy silanes) and fluorinated olefins. The fluorinated alkyl chain imparts a lubricated, non-wettable, low energy surface to the glass insert that impedes the urethane from adhering to the glass surface. However, these semi-permanent mold releases also have drawbacks. Namely, semi-permanent coatings are subject to degradation after multiple castings. In addition, the dense film structure depends upon intensive cleaning and surface preparation of the glass surface. For example, some have tried treating the glass in acidic solutions, basic solutions, or plasma and UV/OZONE exposures. The film quality and durability depends on a uniformly clean and sensitized surface. In practice, the surface preparation quality is judged by the number of castings one obtains from a single treatment. Despite the achievement of multiple castings, the films tend to exhibit inconsistent lifetime properties. This is not a good attribute in a production environment where predictability is an important aspect of manufacturing. Many semi-permanent mold releases contain a sacrificial lubricant that facilitates the release properties. However, the lubricant can also contaminate the surface of the plastic. The contaminant can be removed by polishing techniques, wet chemistry cleaning, or plasma treatment. However, such cleaning techniques add cost and restricts the casting dimension one can process. The larger the casting, the more expensive the capital equipment necessary to post-clean the plastic window. In addition, the inventors have found it necessary to replenish the lubricant after each casting by rubbing the lubricant onto the glass surface. The process of wiping the lubricant is very sensitive to the skill of the operator. Too much lubricant imparts surface defects in the casting while too little lubricant results in damaged plastic or molds. Even if applied correctly, replenishing the lubricant may increase the lifetime of the mold, but it also increases the cost of the mold cleaning and maintenance. Other patents describe internal mold releases (hereinafter "IMR's") for urethanes. IMR formulations are numerous and include carboxylic acids, esters, fluorinated alcohols, phosphate esters and their complex salts. U.S. Pat. No. 5,753,730, assigned to The Mitsui Toatsu Chemical Company, describes the use of nonionic fluorinated and silicone based surfactants, as well as quaternary ammonium salts as IMR's for urethane ophthalmic lens castings. U.S. Pat. No. 5,962,561 to Essilor describes using mixtures of phosphate esters as IMR's for urethane ophthalmic lens castings. The inventors of the present invention have obtained only dissatisfying results when following the examples described in these patents. To date, the release properties on glass surfaces have been poor at best and more typically results in either the glass mold or the plastic casting breaking. Therefore, there is a need for a better release system and methods that will solve the problems mentioned in the foregoing paragraphs.

SUMMARY OF THE INVENTION

The present invention provides a method and a system for fabricating articles made from thermoset resins using an ionic mold release agent. The system in the present invention uses a mold having a metal oxide surface which will enhance the release characteristics of the mold release agent. The release agent can be applied internally with the resin composition or externally on the metal oxide surface. A method of molding a thermoset includes the steps of providing a mold having at least one face surface, forming a metal oxide coating on at least one face surface of the mold, providing an ionic release agent at the metal oxide surface, providing the acid or base conjugate of the release agent at the metal oxide surface, providing a thermoset resin mixture in the mold, and curing the resin mixture in the mold.

In one actual embodiment of the present invention, a metal oxide coating is deposited on a silica containing glass substrate by chemical or physical vapor deposition methods. The metal oxide is $Al_2O_3$. The release agent is an organic acid phosphate ester, and the resin mixture contains an isocyanate or epoxy.

In a second actual embodiment of the present invention, a method of using float glass having $SnO_2$ on a surface is discolored, the method includes the step of providing an ionic release agent externally to the $SnO_2$ surface, providing a mold formed from float glass and providing a urethane or an epoxy resin in the mold, and curing the resin.

In a third actual embodiment of the present invention, a system for molding a thermoset article includes a glass mold having a metal oxide surface, an applicator apparatus for applying a mold release to the metal oxide surface, and a washing apparatus for removing excess mold release from the metal oxide surface.

In a fourth actual embodiment, a plastic ophthalmic lens is produced by the method according to the invention.

In a fifth actual embodiment, a plastic optical filter is produced by the method according to the invention.

In a sixth actual embodiment, a filter replicated from a mold comprised of an optically engineered surface structure is made by the method according to the invention.

In a seventh actual embodiment, a reaction injection molding is made by the method according to the invention.

The present invention thus provides enhanced release properties for external and internal mold releases having an ionic character leading to less surface defects for many optical plastic consumer articles made by cell casting or reaction injection molding techniques.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 shows a front plan view of one alternate embodiment of a mold constructed according to the present invention;

FIG. 5 shows a side plan view of the mold of FIG. 4;

FIG. 6 shows a schematic illustration of a second alternate embodiment of a mold constructed according to the present invention;

FIG. 9 shows a schematic illustration of an ideal silica glass structure;

FIG. 10 shows a schematic illustration of a metal oxide layer formed on the silica glass structure of FIG. 9;

FIG. 11 shows a schematic illustration of a surface chemistry reaction occurring between a silica glass surface and monomers of an isocyanate;

FIG. 12 shows a schematic illustration of a surface chemistry reaction occurring between a metal oxide coated silica glass and a phosphorous containing release agent according to the present invention;

DETAILED DESCRIPTION OF THE PREFERRED EMBODIMENT

Figure 1:
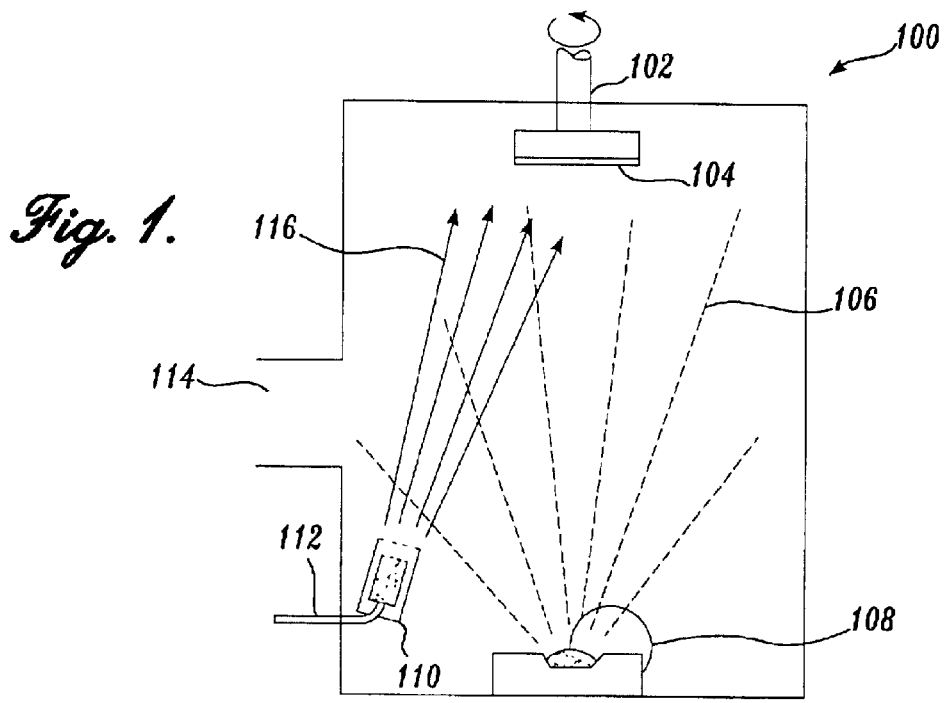
FIG. 1 shows a schematic illustration of a physical vapor deposition (PVD) process for applying a thin metal oxide film onto a mold according to the present invention.
Figure 2:
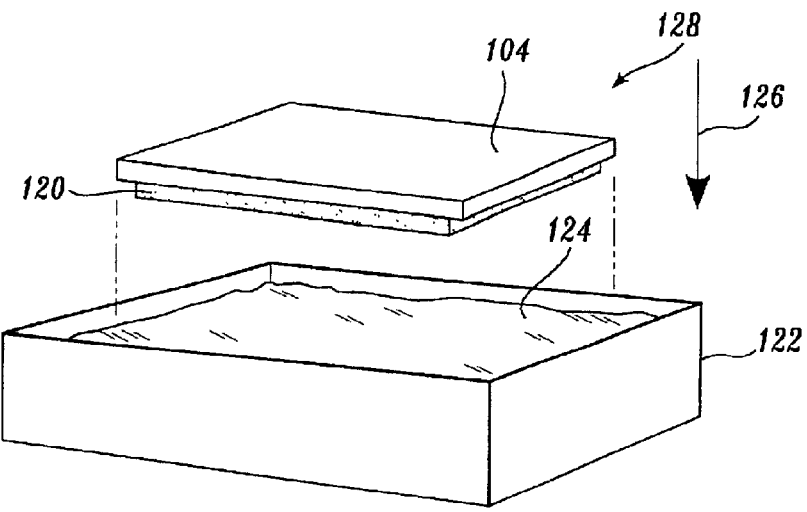
FIG. 2 shows a schematic illustration of one alternate embodiment of applying a release agent externally onto the mold of FIG. 1.
Figure 3:
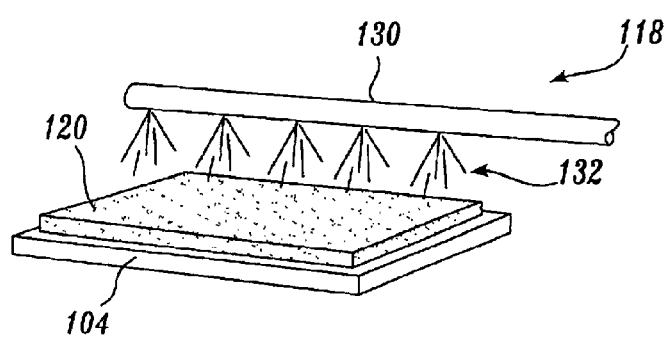
FIG. 3 shows a schematic illustration of one alternate embodiment of washing the mold of excess release agent applied to the mold shown in FIG. 2.

FIGS. 1–3 illustrate a method and system for fabricating articles made from thermoset resins using an organic phosphate acid as the mold release agent. The system in the present invention uses a mold having a metal oxide surface which will enhance the release characteristics of an ionic mold release agent. In one actual embodiment, the mold is a glass mold constructed from float glass which has had a thin metal oxide coating formed on the inner face mold surface. Preferably, the metal oxide is deposited onto the "air-side" of the float glass substrate for highest durability. The thin metal oxide coating can be applied in any number of methods known in the thin metal coating art, such as physical vapor deposition (PVD) and chemical vapor deposition (CVD), including vacuum deposition and sputter deposition. The thin metal oxide coating can have a thickness of about 1 nm to about 10000 nm, preferably the thickness is in the range of about 50 to about 2000 nm, and 100–500 nm is most preferred. FIG. 1 shows a schematic representation of a suitable method and apparatus for forming a thin metal oxide coating on a substrate. While a thin metal oxide coating formed on a glass substrate is preferred, other alternates of the present invention can have the mold constructed from a metal substrate. In this manner, the metal substrate can form the metal oxide coating upon exposure to air. A representative example of an apparatus for forming the thin metal coating includes a chamber 100 having a substrate holder 102 for holding the mold substrate 104 in a preferred orientation while it is coated with a preferred compound. The chamber 100 includes an outlet 114 to a vacuum pump to evacuate the chamber 100 of air. The chamber 100 also includes an ion gun 110 with gas inlet 112. The ion gun can be augmented or replaced by an internal heating system. The substrate is heated to enhance the metal oxide film density and durability. An electron beam source 108 evaporates the compound 106 that is to be deposited onto the substrate 104.

Referring now to FIG. 2, a schematic representation of providing a mold release agent to a member of a mold is illustrated. In one actual embodiment of an applicator apparatus 128, a container 122 is provided for holding a quantity of a suitable mold release agent 124. The release agent 124 can be applied externally on the metal oxide surface 120 by "dipping" (represented by arrow 126) the mold member 104 with metal oxide surface 120 in the container 122 holding the mold release agent 124. Alternatively, the agent can be applied with an applicator, such as a brush or a wipe, or in any of a number of manual application techniques. The aforementioned techniques will be referred to generally as being external methods of application. Alternatively, in another actual embodiment, the mold release agent can be applied in the resin composition mixture as an internal mold release. In this manner, the release agent is mixed with the resin composition and will migrate to the metal oxide surface of the mold member, thereby forming a barrier between the mold surface and the uncured resin composition. According to the present invention, a desirable mold release agent interacts with the metal oxide surface to advantageously enhance the releasing qualities of the agent.

Referring now to FIG. 3, the treated mold surfaces can be rinsed with a washer apparatus 118 to remove any excess mold release agent. The washer includes a spray bar 130, which produces water sprays 132 through nozzles. The sprays 132 rinse excess release agent from the mold member 104 and metal oxide surface 120. Alternatively, the mold surfaces can be wiped with a manual wipe, such as an absorbent fabric. While removing any excess mold release is generally preferred, the step is optional.

Once the mold release agent has been applied in any one of the foregoing external techniques to the mold member, a mold can be constructed. Alternatively, the release agent can be applied either internally or externally after the mold has been built. The resin composition is then introduced to the mold, and the curing process can continue in its conventional manner.

According to the present invention, suitable molds include those used in cell casting and reaction injection molding (RIM). In cell casting, a mold can be constructed from any number of members having one or a plurality of facing surfaces. A "face", "facing", or "inner" surface will be used to denote that side of a mold which will contact the resin composition. The number of members is determined by the desired finished product. For example, a flat cell cast sheet would require two members with surfaces to shape the first and the second sides of the sheet. For optical applications, such as lenses, glass also provides a smooth finished surface suitable for such ophthalmic applications. According to the present invention, the cell cast or RIM mold is provided with a facing surface which includes a metal oxide. As previously mentioned, the metal oxide can be deposited onto a mold or alternatively the mold can be made of a metal which forms the metal oxide on exposure to the atmosphere or an oxidizing treatment such as $O_2$ plasma.

Referring now to FIGS. 4 and 5, a first actual embodiment of a mold used in cell casting is illustrated. A mold 200 is constructed from a planar first 202 and second 206 glass members separated by a gasket 204. In the actual embodiment, the cell cast mold includes two plates of float glass 202, 206 each member being coated at least on the one facing surface with a thin metal oxide 208, 210. The plate members 202, 206 are separated by a rubber gasket 204. The gasket 204 is placed in between the facing surfaces of the first mold member 202 and the second mold member 206 in a manner so as to leave an opening 220 in the mold 200. The opening 220 is used to pour the resin composition in the mold 200. The gasket 204 forms a seal on three sides between the rectangular plate members 202, 206. A spacer placed around the perimeter of the gasket (not shown in the figure) determines the thickness of the molded casting. A second mold member 206 is laid next to the rubber gasket 204, opposite of the first mold member 202, such that the inner facing surfaces 208, 210 of the plate members 202, 206 contain the metal oxide coating. The plates 202, 206 are held together with compressive binder clips (not shown). However, any other suitable fastener can be used.

FIG. 6 shows a schematic illustration of a second actual embodiment of a mold according to the present invention for casting ophthalmic lenses. The mold 300 includes a first 302 and a second 304 member having face surfaces 310, 312 coated with a thin metal oxide layer. The members are fabricated from precision ground-to-shape glass substrates. The first member 302 includes an inner 310 (face) surface and outer 314 (air) surface, wherein the inner surface 310 is concave. The second member 304 includes an inner 312 and outer 316 surface, wherein the inner surface 312 is opposite of the concave surface 310. The second member inner surface 312 is planar. The inner surfaces 310, 312 of the first 302 and the second 304 member are coated with a metal oxide. The first member 302 is separated from the second member by a gasket 306, 308 at the first upper edge and a second lower edge, respectively. While a concave surface has been shown, other molds may include one or more flat, concave or convex surfaces as required of the particular manufactured good. Articles produced by cell casting include not only ophthalmic structures, such as eye lenses, but also articles used in optical applications such as windows, filters, displays and microreplicated structures. Reaction injection molding is used to form many commonly used plastic articles in mass quantities, such as automotive components including but not limited to body panels.

In one actual embodiment of the invention, plastic ophthalmic lenses can be produced by cell casting according to the invention. Single vision lenses are generally cast in near shape and then machined to prescription. However, bifocal/trifocal and progressive multi focal surfaces are not machined, and must be processed by a method called "cast-to-prescription." Progressive lenses can be produced in a semi-finished state where the complex curved front of the lens is cast to final shape while the back part of the lens is cast to near shape and then finished by grinding and polishing. Alternatively, the entire progressive lens is cast to prescription so that further machining to the surface is unnecessary. A schematic illustration of a mold configuration for a semi-finished cast to prescription lens is illustrated by FIG. 6. The process according to the invention treats the ophthalmic insert much like the float glass mold surface. A thin film of a metal oxide is applied over the mold surface by any suitable thin-film deposition or surface modification process such as PVD or CVD method. The coated surface can then be used with either the external mold releases (applied by dipping the mold into a vat of mold release agent) or with internal mold releases. Because the method according to the invention decreases the release force necessary to separate the mold from the lens while concurrently eliminating the need for the application of additional lubricant, the plastic ophthalmic lenses made according to the invention have less surface defects than lenses made by conventional methods. Surface defects produced by conventional release methods can include pits, haze and optical aberrations. Furthermore, surface contamination from lubricating materials can adhere to the casting on a non-uniform manner. As a result, the surface will have regions of very low surface energy (resulting from the lubricant contamination) and regions of higher surface energy (inherent to the native plastic resin). The complex surface energy distribution inhibits the application of uniform hard-coating used to protect the plastic lens from scratches. In addition, color tinting of ophthalmic lenses is a post-casting process and is impeded by low surface energy contaminating lubricants. As a result, the non-uniform contamination on the plastic lens yields a non-uniform dye absorption in the plastic and therefore produces poor tinting properties. Therefore, the plastic ophthalmic lenses made according to the invention have less surface defects such as pitting, haze, optical aberrations, and non-uniform contamination that results in poor tint quality and poor hardcoat quality thus reducing the need for expensive finishing, grinding and polishing.

In another actual embodiment of the invention, plano plastic filters (windows) are cell cast between two tempered sheets of float glass according to the invention. Applications for plastic filters include, among others, electroluminescent and liquid crystal displays (LCD's). The mold configuration is schematically illustrated in FIGS. 4 and 5, and has been described above. A spacer and gasket forms an empty cell (or cavity) between two sheets of tempered glass. An alumina ($Al_2O_3$) film has been formed on both of the inner facing glass surfaces that form the walls of the cavity. The alumina coating is then treated with a mold release agent by the methods described above. An uncured polymerizable resin is then poured into the mold or cavity, and thereafter cured under conventional methods of curing such as UV radiation, or by thermal means. The cured resin is then separated from the mold. A resin article fabricated according to the present invention provides for precise copying of the mold surfaces (also called high fidelity replication), and easy release without residue or contaminants on the resin surface. Therefore, the filters and displays made according to the invention have less surface defects than conventionally manufactured filters and windows, thus, leading to enhanced optical qualities such as transmittance and clarity. By using the process of the present invention, expensive post casting polishing processes are avoided.

In yet another aspect of the present invention high fidelity replication enables the replacement of the glass mold substrates with inserts that have engineered surface structures that allow the replication of the optically engineered features onto the resin surfaces. Engineered surfaces including refractive, diffractive and stochastic (random) structures are replicated by the method and system according to the present invention. The method and system according to the present invention for replicating engineered surface structures is similar to the previous method, described for ophthalmic and filter and window structures, however, at least one of the mold members is replaced with a structured surface mold face having a metal oxide coating. The structured surface is fabricated to impart one of the engineered surfaces. The engineered surface structures produced according to the invention have less surface defects than conventionally manufactured structures, thus, leading to enhanced optical properties owing to the improved release characteristics from the mold.

Figure 7:
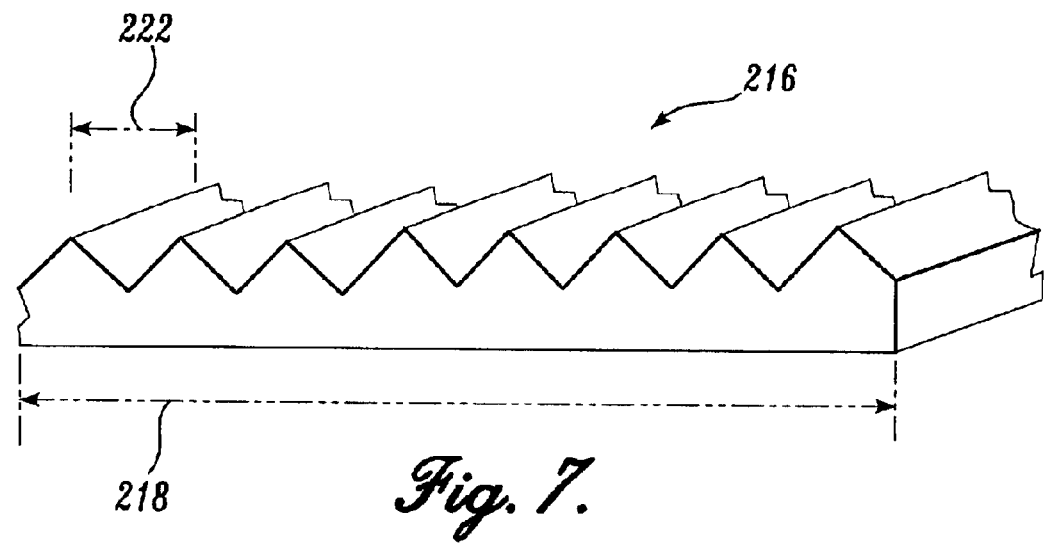
FIG. 7 shows a perspective enlarged view of one embodiment of an engineered surface structure according to the present invention.

Molds for refractive structures are generally produced by precision diamond machining. These members are fabricated and used to produce Fresnel lenses, tilting optics, beam diffusing optics and total internal reflectance (TIR) optics. U.S. Pat. No. 6,100,952, assigned to Korry Electronics Co., of Seattle, Wash., describes the latter structures and is herein incorporated by reference. This patent demonstrates an example of TIR optics application used with active matrix LCD's (AMLCD's). FIG. 7 shows the details of the surface structure 216 used to replicate the TIR optical plastic component. FIG. 7 shows an actual embodiment of a cast insert surface 216 with triangular prismatic surfaces. Reference numeral 222 indicates the distance separating peaks while reference numeral 218 represents the scale of the structure portion. The distance 222 can be in the range of about 10 to about 300 microns. The process according to the present invention treats the refractive structure surface 216. A thin metal oxide coating is applied over the diamond machined surface member 216 by any suitable thin-film deposition or surface modification process such as CVD or PVD method. The coated member 216 can then be used as a mold surface with either external mold releases (e.g., dipping in a vat of release agent) or with internal mold releases. The resulting castings have less surface defects than conventionally manufactured structures, thus leading to improved optical characteristics.

Figure 8:
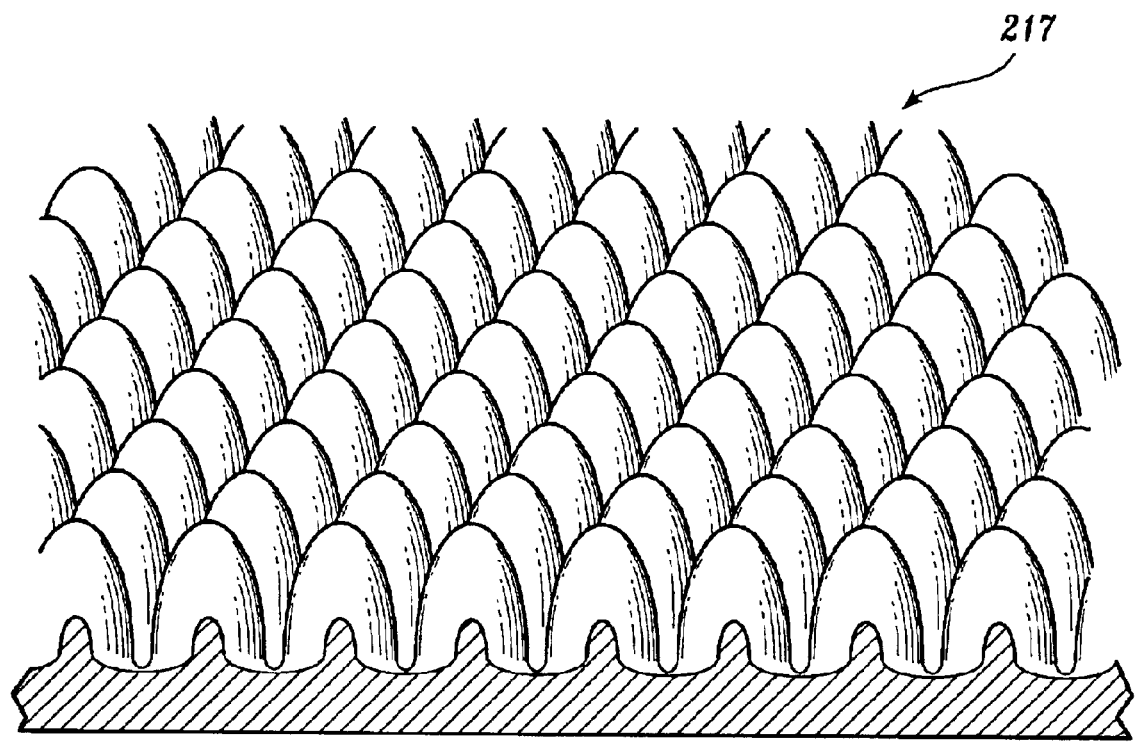
FIG. 8 shows a perspective enlarged view of a second embodiment of an engineered surface structure according to the present invention.

Molds for diffractive structures are generally produced by photolithography techniques. These structures are fabricated and used to produce gratings, optical recording media, and antireflective motheye structures. FIG. 8 shows an actual embodiment of a diffractive structure mold particularly suitable for this process. The motheye structure is analogous to an acoustic dampening (noise reduction) surface structure. The motheye surface includes an array of conical protrusions 217 spaced about 200 nm apart. Such structures impart an optical anti-reflecting property that reduces the specular reflection of light from a plastic surface from about 4% to less than about 1%. FIG. 8 shows the details of the surface structure used to replicate an anti-reflecting motheye structure. The process according to the present invention treats the diffractive structure surface. A thin film of metal oxide is applied over the motheye surface by any suitable thin-film deposition or surface modification process such as CVD or PVD method. The coated motheye surface member can then be used as a mold surface with the external mold releases (e.g., dipping the mold in a vat of release agent) or with internal mold releases. The resulting casting has less surface defects than conventionally manufactured structures leading to improved optical characteristics. In addition, motheye engineered surfaces add a significant non-recurring cost to the casting mold. Poor release properties often result in breakage of these expensive mold features. The improved release realized by the present invention prolongs the life of expensive mold substrates.

Molds for stochastic structures are generally produced by chemical etching float glass substrates. The etching process results in a random rough surface that scatters light in all directions, thereby reducing specular reflectance light. These mold inserts are fabricated and used to produce contrast enhancement display windows where direct sunlight can interfere with the readability of the display (such as ATM's). The process according to the present invention treats a stochastic structure surface. A thin film of a metal oxide is applied over the stochastic structure member by any suitable thin-film deposition or surface modification process such as PVD or CVD method. The coated stochastic structure can then be used as a mold surface with either external mold releases (e.g., dipping the mold into a vat of mold release agent) or with internal mold releases. The resulting casting has less surface defects than conventionally manufactured structures leading to improved optical characteristics. In addition, the chemically etched engineered surfaces adds cost to the casting mold. Poor release properties often result in breakage of these mold features. The improved release realized by the present invention prolongs the life of the mold substrates.

Reaction injection molding ("RIM") uses polyurethanes, from low density flexible and rigid foams, semi rigid and self-skinning foams, to non-foamed elastomers. The reaction injection molding process is well known to those skilled in the art. The conventional reaction injection molding process uses a mold release agent to prevent the mold from adhering to the casting. The conventional release agents used in RIM include microcrystalline waxes dispersed in solvents. In addition, silicones and silicone oils are sometimes used. Problems can occur if the wax or oil is not adequately removed prior to painting. The process according to the invention treats the RIM mold surface. A thin film of a metal oxide is formed over the RIM mold surface by any suitable thin-film deposition or surface modification process such as PVD or CVD method. Or in the case where the mold substrate is made from a metal, the oxide coating is formed on exposure to the ambient atmosphere. The coated metal oxide surface can then be used with either the external mold releases or internal mold releases. Because the method according to the invention decreases the release force necessary to separate the mold from the plastic part, the part made according to the invention has less surface defects than RIM parts made by conventional methods using conventional molds. Therefore, the plastic parts made according to the invention have enhanced surface qualities and uniformity.

While not intending to be bound to any particular theory, the inventors believe that the improved release properties of the release agent are due to ionization chemistry occurring at the metal oxide/metal hydoxyl surface when in contact with an aqueous solution or a polar solution. FIG. 9 illustrates the surface of a conventional silica glass mold 400 and FIG. 10 illustrates the silica mold 404 having a metal oxide surface 402. It is seen that both surfaces 400 and 402 have a propensity to form hydroxyl groups at the surface. The differences lie with the surface chemistry that occurs when different metal oxides are exposed to a polar solvents such as an aqueous solution or polar solution (e.g., polyol enriched pre-polymers). For a given metal oxide or ceramic metal oxide exposed to an aqueous solution, there will be a surface charge associated with the metal oxide that will depend upon the pH of the solution. Thus, under the appropriate circumstances, the surface of silica can be positively or negatively charged. For example, silica will exhibit a positive charge when exposed to highly acidic solutions (pH less than 2). However, when exposed to less acidic solutions (pH greater than 2) the silica surface exhibits a negative charge. For the most part, the surface of silica will exhibit a negative charge because only the most acidic conditions can produce a positive charge. On the other hand, the alumina coating of FIG. 10 exhibits a positively charged surface when exposed to solutions having a pH of less than about 8, meaning that for all acidic and even mildly basic solutions, the surface of the alumina will be positively charged. The positively charged surface is highly attractive to negatively charged anionic surfactants. Similarly, when the metal oxide is exposed to a nonaqueous polar solution (for example a polyol-enriched pre-polymer) a predictable surface charge can be produced on the mold face by adding acidic or basic materials to the solution (pre-polymer). For a more in depth treatment of the subject concerning acid and base chemistry with metal oxide surfaces, the reader is encouraged to refer to *Surfactant Science Series Vol* 49, *Wettability*, John C. Berg, and *Polymer Interface and Adhesion*, Souheng Wu, both of which are herein incorporated by reference. By way of comparison pure silica has a positive surface charge when exposed to an acidic solution with a pH below than 2, while alumina has a positive surface charge when exposed to a solution with a pH below 8. In presently used fabricating methods which use mildly acidic release agents (such as an anionic surfactant) and non-metallized silica glass molds, the negative charged base conjugate of the release agent will not form a durable bond with the negatively charged silica surface. As a result, a barrier release film will not form between the resin and the silica substrate, hence the resin can form an undesirable adhesive bond with the silica and release will not occur. In sharp contrast, the mildly acidic anionic release agent will be highly attracted to the positively charged alumina surface resulting in the spontaneous formation of a release film that will impede adhesion between the resin and the alumina surface.

In the polymerization reaction of an isocyanate and a polyol, the isocyanate 406 can react with the hydroxyl groups on the mold surface rather than the polyol, as shown in FIG. 11. Thermosetting resins can adhere to the silica mold surface as a result of this reaction between the isocyanate and the mold surface hydroxyl groups. Hence, the inventors of the present invention believe to have discovered the source of the problem why resin compositions adhere to molds, particularly where the resin includes an isocyanate and the mold is constructed from silica glass. However, isocyanates are not the only molecules to adhere to silica molds. The present invention can be used for any polymerizable composition that has reactive groups with an affinity for hydroxyl groups. The inventors propose a novel solution to the problem.

As previously described, positively charged metal oxide surfaces are generated when exposed to acidic (low pH) solutions. The positively charged surface is important to the spontaneous formation of anionic mold release films. In contrast, metal oxide surfaces exhibit a negative charge when exposed to basic solutions. For each metal oxide, there is a pH value for which there is an equal tendency to form negatively charged structures and positively charged structures (resulting in a net zero surface charge). This "zero charge" pH value is characteristic of metal oxides and is called the isoelectric point (IEP). At pH values less than the IEP, the metal oxide surface exhibits a net positive charge. A negative surface charge results when the metal oxide is exposed to an aqueous solution of a pH value greater than the IEP. An anionic release film will form spontaneously when deposited onto a metal oxide with an IEP greater than the pH of the solution containing the anionic mold release material.

Figure 13:
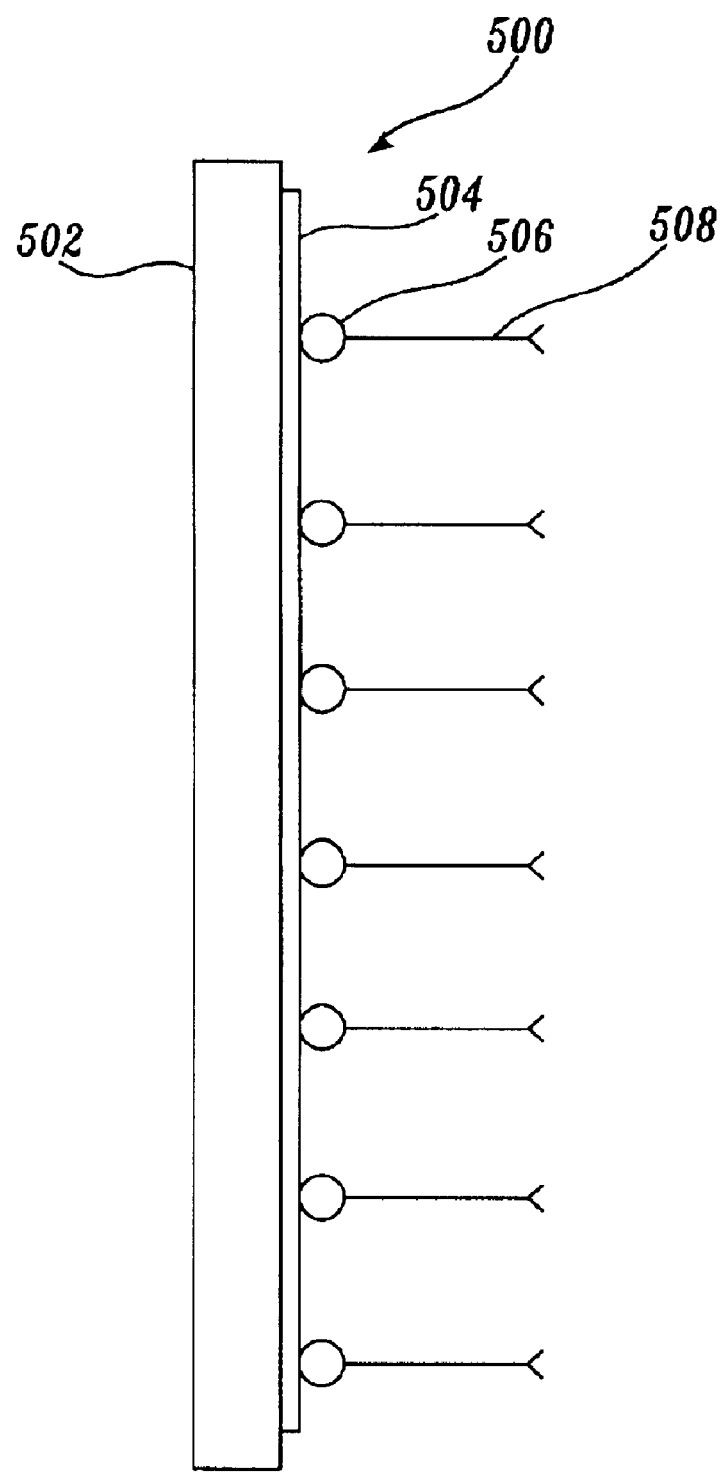
FIG. 13 shows a schematic illustration of an ionic or polar compound bonding to a metal oxide surface according to the present invention.

According to the present invention, in the case of mildly acidic release agents, a positively charged mold surface created by compounds with relatively higher IEP's than silica is desirable because a large number of mildly acidic and ionic materials with good release features are commercially available. It is well understood in the literature that metal oxides with higher IEP values exhibit a positively charged surface over a wider pH range than metal oxides with lower IEP's. According to the present invention, an anionic or conjugate base of an acidic release agent could preferentially attach to a positively charged mold surface created by a metal oxide with a relatively higher IEP than silica, thus placing a barrier between the silica and the monomer reactive groups. Alternatively, if a suitable conjugate acid or basic release agent is available, it could preferentially attach to a negatively charged mold surface, such as silica. Therefore, according to the invention to preferentially attach an acidic or an anionic release agent to the surface of a mold, the pH of the solution must be adjusted to a value below the IEP value of the particular mold surface. This is represented graphically in FIG. 12, showing a phosphonic acid compound 408 preferentially attached to the metal oxide coating 402. FIG. 13 shows a mold member including a glass substrate 502 having a metal-oxide coating 504. A release agent with a polar region 506 bonds to the metal oxide surface 508 providing a barrier between the glass substrate 502 and a resin (not shown). If the surface exhibits a high IEP (greater than 7), then it is much easier to find a conventional mildly acidic release agent for that surface. A suitable mold surface for mildly acidic release agents has been found to be metal oxides, and in particular, alumina. Therefore, according to the invention, a solution consisting of an suitable acidic or anionic release agent must exhibit a pH lower than the IEP of the metal oxide coating. Alternatively, for a basic or acid conjugate of a release agent, a negatively charged mold surface is desirable and a metal oxide with a low IEP is desirable. In yet another actual embodiment of the present invention, float glass is used with an external release agent. Float glass is made by a process wherein the molten glass is allowed to float on a liquid pool of tin. As a result, one side of the glass has a tin enriched surface as opposed to the air-side of that same piece of glass. The air-side of float glass is mainly $SiO_2$ (up to 73% by wt). Small amounts of network modifiers such as $NaO_2$, CaO and MgO are also found at the air-side surface of float glass. While the network modifiers and the $SiO_2$ components impart an amphoteric (having cationic and anionic charge on the surface) nature to the substrate, the main constituent $SiO_2$ demonstrates a low IEP value of about 2. It is the inventors' belief that anionic mold releases fail against the air-side of float glass because of poor adhesion properties between the mold release and the low IEP surface.

In contrast, the tin side of float glass is enriched with $SnO_2$. X-ray Photoelectric Spectroscopy (XPS) studies have shown as much as 39% $SnO_2$ at the surface of the tin-side of float glass. See Baitinger, William, et al., *Journal of Non-Crystalline Solids*, 38 & 39 (1980) 749–754, which is herein incorporated by reference. The isoelectric point of tin-oxide is about 6. Thus the tin-side of float glass demonstrates acceptable release properties for polyurethane when coupled with anionic external mold release agents.

The discovery of anionic external mold releases (EMRs) used in conjunction with $SnO_2$ coatings has significant economic implications. Metal-oxide films are generally custom applied to the substrate by various batch coating techniques (PVD, CVD, sol-gel). The deposition process increases the cost of glass molds. However, tin-oxide is inherent to one side of standard float glass, hence the metal-oxide coating adds no cost to the mold. Furthermore, architectural glass, such as SUNGATE® Low E coated glass by PPG, is produced on a large commercial scale with CVD deposited tin-oxide films applied to the air-side of float glass. Both the tin-side float glass and $SnO_2$ coated architectural glass are economical sources of substrates ready to be used with the disclosed process.

A suitable metal oxide coating used in the present invention includes a metal oxide or ceramic oxide compound exhibiting an isoelectric point such that the ionic conjugate of suitable mold releases are preferentially oppositely charged. The term metal oxide is intended to refer to the higher and lower valent oxides of a metal where more than one valance state exists. A suitable metal oxide coating preferably exhibits an IEP of greater than 2. More preferably, the metal oxide coating exhibits an IEP of greater than or equal to about 4. For example, $TiO_2$ exhibits an IEP of about 4. While $TiO_2$ is a suitable coating, other oxides of Ti are also suitable, such as TiO, $Ti_2O_3$, and $Ti_3O_5$. Still more preferably, the metal oxide coating of the present invention exhibits an IEP of greater than or about equal to 8. A suitable metal oxide coating exhibiting an IEP of about 8 is alumina, $Al_2O_3$. Besides alumina, the oxides $Al_2O$ and AlO are also suitable. Other suitable metal oxide compounds include oxides of zirconium, such as $ZrO_2$, tantalum, $Ta_2O_5$, hafnium, $HfO_2$, yttrium $Y_2O_3$, niobium, $Nb_2O_4$ and $Nb_2O_5$, Nickel, NiO, magnesium, MgO and $MgO_2$, iron, $Fe_2O_3$, $Fe_3O_4$, FeOOH, and $Fe(OH)_2$, and chromium $Cr_2O_3$, $CrO_2$, and $CrO_3$. Iron oxides have an isoelectric point in the range of about 7 to about 12.5 depending on the oxidation state, making iron oxides suitable coatings in the present invention. Chromium oxides have an isoelectric point in the range of about 6 to about 7. NiO exhibits an IEP of about 10. MgO exhibits an IEP of about 12. The isoelectric point can be in the range of about 2 to 12. In addition, any combination of two or more of any of the aforementioned metal oxides (e.g. $Al_2O_3$—MgO) are also suitable coating materials. While this list is not exhaustive, other metal oxides exhibiting a surface charge opposite of the release agent charge can be selected. While the IEP is not the sole determining factor in choosing a metal oxide coating, the inventors have discovered that alumina performs well, is easily deposited on a substrate, and is durable to withstand repeated cycling as well as being commercially viable.

A suitable mold release agent includes any mold release having an ionic character, preferably anionic, but alternatively cationic when the mold substrate has a relatively low IEP such that opposite charges are created between the mold surface and the release agent or the resin mixture. While the only requirement of a release agent to use in the present invention is that the release agent possesses an ionic nature, several classes of suitable compounds are provided as examples, and are not intended to be limiting. One suitable class of compounds is disclosed in U.S. Pat. No. 4,118,235 to Horiuchi et al., which is herein incorporated by reference. Other release agents are the internal release agents disclosed in U.S. Pat. No. 5,962,561 to Tuushani et al., which is herein incorporated by reference. Classes of compounds generally suited to use in the present invention include phosphates, phosphonites, sulfates, sulfites and carboxylates, such as organic phosphate esters and acids, organic phosphite esters and acids, organic sulfate esters and acids, organic sulfite esters and acids, carboxylic esters and acids, and quaternary ammonium compounds.

A suitable mold release used in the present invention also includes compounds having the following general chemical formula:

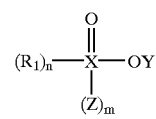

wherein Y is any element or combination of elements that forms an acid conjugate upon dissociation such as H, $NH_4$, $NR_4$ (where R is an alkyl chain such as methyl, ethyl, propyl, and butyl or an aromatic group.) or Na. Y is preferably hydrogen. X is any element that facilitates the dissociation and formation of a base conjugate with reduced chemical interaction with the polymer resin. Examples of X are P, S, and C, where P is preferred. $R_1$ is any combination of elements that facilitates solubility within the polymer resin and also provides a non-reactive barrier film suitable for providing release properties. Examples of $R_1$ include alkyl, fluorinated alkyl, alkyl ester and fluorinated alkyl esters with chain lengths between 8 to 20 carbon units. The integer n is between 1 and 2, wherein n is 1 for carboxylic acid, sulfonic acid, phosphonic acid, and di-acid phosphate esters. The integer n is 2 for phosphonic acid and mono-acid phosphate esters. Alternatively, $R_1$ can be alkylaryl or polyether derivatives. Z is either oxygen as with sulfonic acids or —OH as with di-acid phosphate esters or phosphonic acids. For such compounds, m is an integer equal to 1. For all other materials such as carboxylic acid, mono-acid phosphates and phosphonic acid, m is equal to 0. A suitable release compound is perfluorododecanoic acid or octylphosphonic acid or any combination thereof. Exemplary compounds useful as release agents in the present invention are sold under the trade names Zelec® MR-1 obtained from the Stepan Company of Northfield, Ill., Zonyl® UR obtained from the DuPont Company of Wilmington, Del., and Fluowet® PL80 obtained from the Clariant Company of Muttenz, Switzerland.

A suitable resin system used in the present invention includes the resin compositions which are used in the manufacture of the aforementioned articles in the aforementioned industries using casting and RIM techniques. Suitable resins for use in the present invention include the class of resins known as thermosets. Included within this class are polyurethanes, polyureas, epoxies and polyesters. Urethane resins generally consist of mixtures of bifunctional or multifunctional isocyanates and bifunctional or multifunctional polyols and polythiols. The isocyanate reacts with (for example) the polyol's hydroxyl group to form a urethane link. Polyureas are formed by the reaction of isocyanates and multi-functional amines. The isocyanates can have an aromatic or aliphatic structure. Examples of isocyanates include isophorone diisocyanate, 1,6-hexamethylene diisocyanate, toluene diisocyanate, xylylene diisocyanate, bis(4-isocyanatocyclohexyl)methane, cyclohexane diisocyanates, and tetramethylxylylenediisocyanate. The aromatic structures are used to increase the refractive index of a resin in applications such as thin, lightweight ophthalmic lenses. Aliphatic structures are generally used to impart UV stability. The polyols can also have an aromatic or aliphatic structure. In addition, the polyols can include thiol functional reactants to increase the refractive index of a urethane cast plastic. Examples of polyols include glycerol, ethylene glycol, propane diol, bisphenol A, trimethanol propane, polycaprolactone diols and triols, and di(2-mercaptalkyl) ether. One suitable resin system useful in the present invention to fabricate ophthalmic lenses and optically active structures of all kinds is known by the tradename CR-39®, supplied by the PPG Company of Pittsburgh, Pa. CR-39® is also commonly called ADC for the thermosetting resin diallyl diglycol carbonate. In one actual embodiment, isophorone diisocyanate is used with polycaprolactone triol. Other resins suitable to use in the present invention are supplied by the Vantico Company of Basel, Switzerland, and Hysol OS0100 Epoxy supplied by the Henkel KgaA Company of Düsseldorf, Germany. As mentioned above, the release agent can be applied internally to the resin composition, where the ionic release agent migrates toward the metal oxide surface. Dyes, coloring agents, or pigments may be added to the resin composition as desired.

EXPERIMENTAL EXAMPLES

Introduction

Several sample castings were produced to compare the release properties of the resins using the current invention to other release methods. The mechanical force necessary to open the sample molds was measured on an Instron Tensile Test System. The absolute pull-force as well as the force against displacement curve indicates how well the release method performs.

Figure 15:
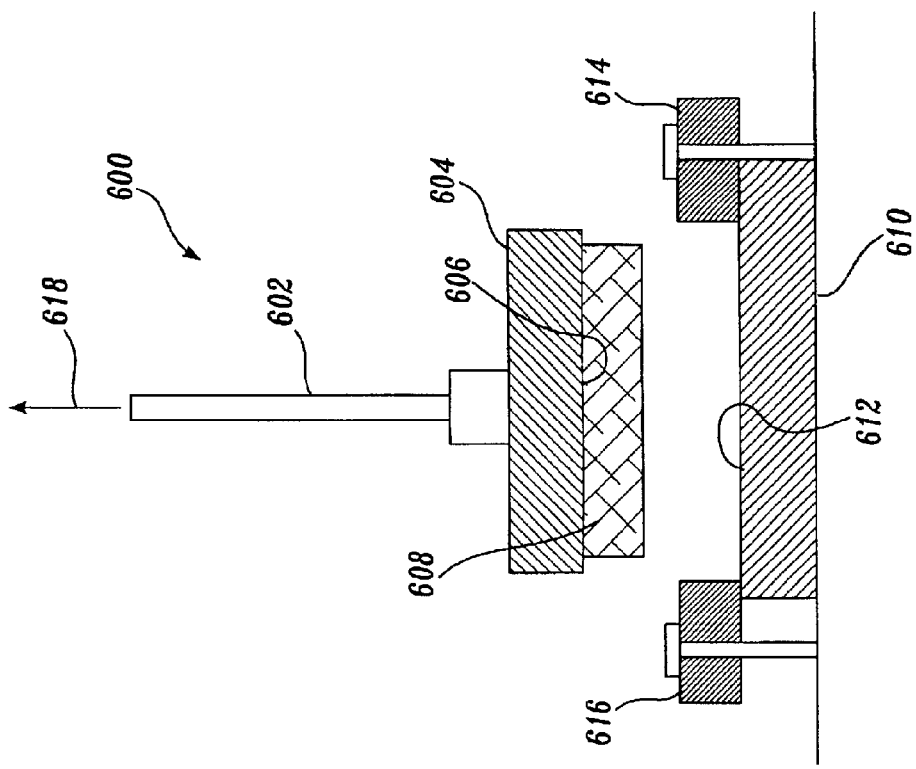
FIGS. 14 and 15 show a schematic illustration of a testing apparatus according to the present invention.
Figure 14:
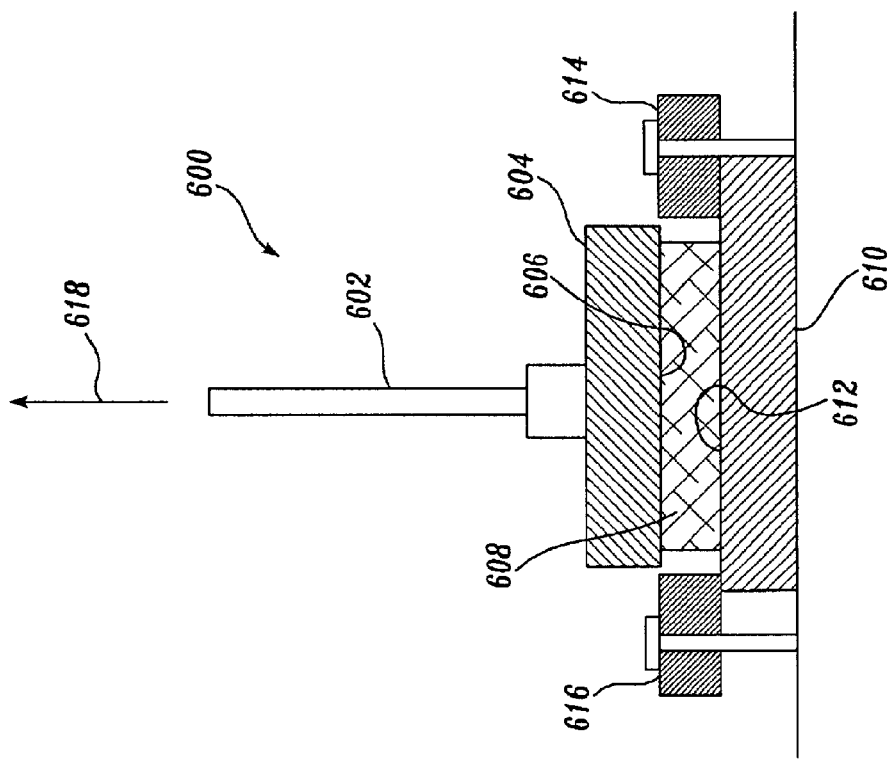

FIGS. 14 and 15 show the mold and pull-force testing configuration 600. The mold cavity includes an untreated float glass substrate 604 (top glass in FIG. 14) and a surface treated float glass substrate 610 (bottom glass in FIG. 14). A bolt 602 was fastened to the side opposite of the casting on the untreated glass substrate 604. This bolt 602 is attached to the Instron test fixture (not shown) for pull-force measurements. The bottom glass 610 is treated by various methods as described in the forthcoming experimental example section. The bottom glass 610 is held in position with clamps 614 and 616, while top glass 604 is pulled in the direction of arrow 618.

A urethane resin mixture 608 (described in the example section) is poured between the two glass substrates and cured. A pull-force test is then performed on the mold assembly/cured resin to pull float glass substrate 604 in a direction indicated by arrow 618. This test configuration allows the resin to preferentially adhere to the untreated glass substrate surface 606. Therefore, the pull-force test measures the release properties of the interface between the urethane resin 608 and the bottom treated glass surface 612 as shown in FIG. 15.

Urethane Resin Castings:

Example 1

Apply 0.5 microns of $Al_2O_3$ film to a heated float glass substrate by PVD (Physical Vapor Deposition). Assemble the test mold as shown in FIG. 14. The alumina coated glass substrate is the treated (bottom) mold surface 612 shown in FIG. 14.

Charge a flask with 22.2 g of isophorone diisocyanate (IPDI), 20 g of polycaprolactone triol (average MW=300 g/mol) and 0.22 g of ZELEC MR-1 (a monoacid phosphate ester from the Stepan Company). Mix and heat the mixture to 60° C. until obtaining a homogenous/clear solution. Pour the clear solution in the test mold and cure at 160° C. for 4 hours.

Figure 16:
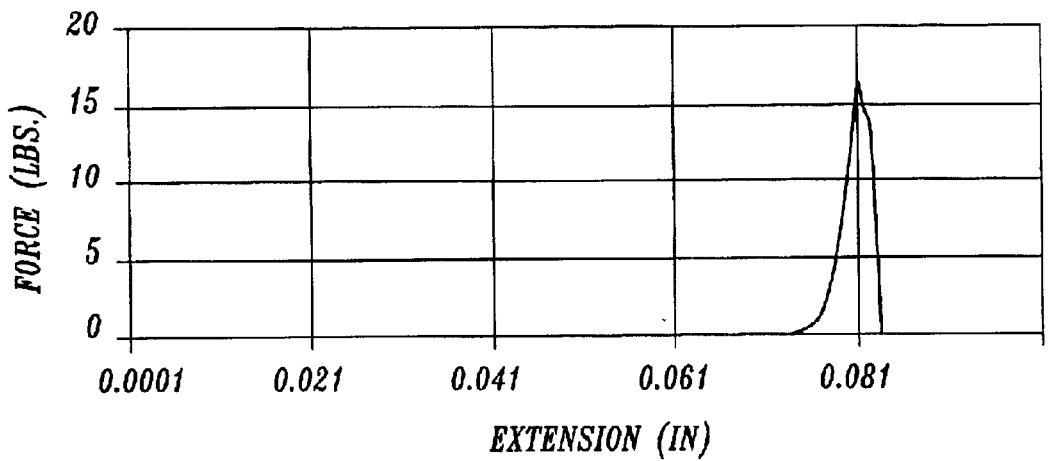
FIG. 16 shows a graphical representation of the pull force vs. displacement curve for Example 1.

FIG. 16 shows the pull-force vs. displacement curve. Release occurred as a continuous event at about 18 lbs.

Example 2

Apply 0.5 microns of $Al_2O_3$ film to a heated float glass substrate by PVD. Soak the $Al_2O_3$ treated mold face in a solution of 0.4% by weight Zonyl UR (a fluorinated phosphate ester mixture from the DuPont Company) dissolved in a 60/40 dionized (DI) water/isopropanol mixture for 30 minutes. Briefly rinse the residual Zonyl UR solution from the treated glass with tap water and dry. Assemble the test mold as shown in FIG. 14. The Zonyl UR/alumina coated glass substrate is the treated mold surface 612 shown in FIG. 14.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold and cure at 160° C. for 4 hours.

Figure 17:
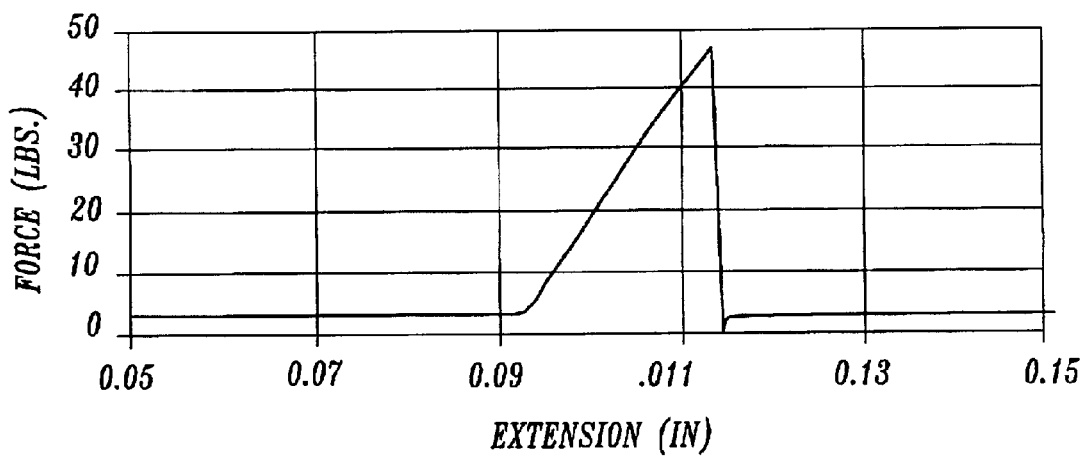
FIG. 17 shows a graphical representation of the pull force vs. displacement curve for Example 2.

FIG. 17 shows the pull-force vs. displacement curve. Release occurred at about 40 lbs.

Comparative Example 3

Assemble a mold using untreated float glass as the bottom mold surface 612 shown in FIG. 14.

Charge a flask with 22.2 g of isophorone diisocyanate (IPDI), 20 g of polycaprolactone triol (average MW=300 g/mol) and 0.22 g of ZELEC MR-1. Mix and heat the mixture to 60° C. until obtaining a homogenous/clear solution. Pour the clear solution in the test mold and cure at 160° C. for 4 hours.

Figure 18:
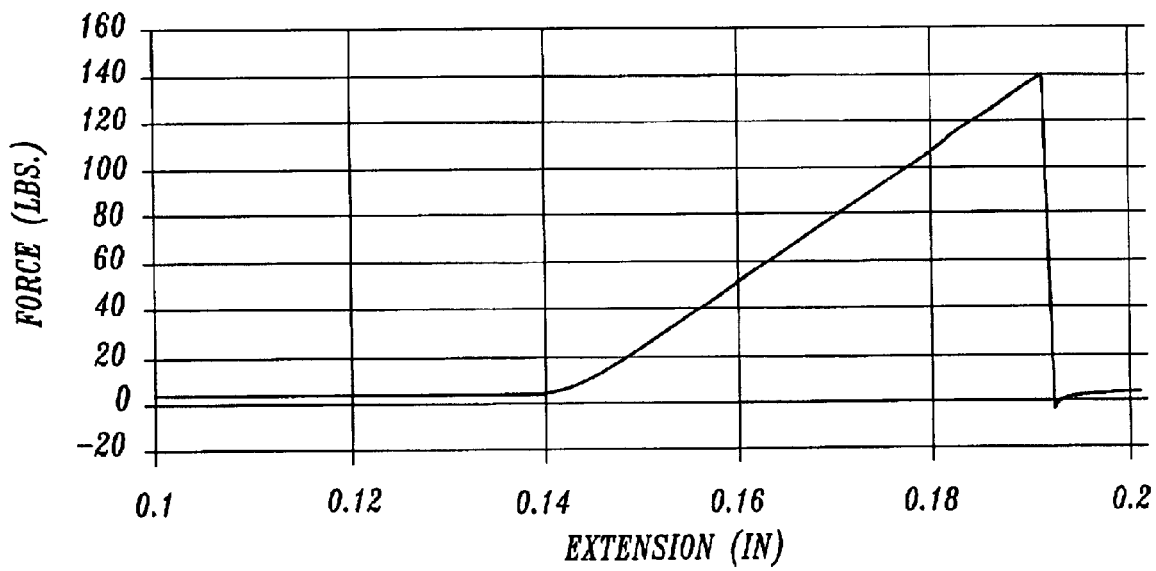
FIG. 18 shows a graphical representation of the pull force vs. displacement curve for Example 3.

FIG. 18 shows the pull-force vs. displacement curve. The mold assembly broke prior to release at about 140 pounds.

Comparative Example 4

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold and cure at 160° C. for 4 hours.

The resulting casting failed to release from the $Al_2O_3$ coated glass.

Example 5

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Charge a flask with 22.2 g of isophorone diisocyanate (IPDI), 20 g of polycaprolactone triol (average MW=300 g/mol) and 0.15 g of perfluorododecanoic acid. Mix and heat the mixture to 60° C. until obtaining a homogenous/clear solution. Pour the clear solution in the test mold and cure at 160° C. for 4 hours.

The resulting casting released from the alumina coated glass and not from the untreated glass.

Example 6

Apply 0.5 microns of $Al_2O_3$ film to a heated float glass substrate by PVD. Soak the treated mold in a solution of 0.5% by weight perfluorododecanoic acid dissolved in a 50/30/20 DI water/2-butanone/acetone mixture for 1 hour and 30 minutes. Briefly rinse the residual solution from the treated glass with tap water and dry. Assemble the test mold as shown in FIG. 14. The fluorinated acid/alumina coated glass substrate is the treated mold surface 612 shown in FIG. 14.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold and cure at 160° C. for 4 hours.

The resulting casting released from the alumina coated glass and not from the untreated glass.

Example 7

Apply 0.2 microns of $TiO_2$ (Isoelectric Point=4.0) film to float glass by PVD evaporation method.

Charge a flask with 22.2 g of isophorone diisocyanate (IPDI), 20 g of polycaprolactone triol (average MW=300 g/mol) and 0.22 g of ZELEC MR-1. Mix and heat the mixture to 60° C. until obtaining a homogenous/clear solution. Cast the clear solution onto the $TiO_2$ coated glass and cure the resin at 160 C for 4 hours.

The resulting casting released from the $TiO_2$ film:

Example 8

Charge a flask with 22.2 g of isophorone diisocyanate (IPDI), 20 g of polycaprolactone triol (average MW=300 g/mol) and 0.22 g of ZELEC MR-1. Mix and heat the mixture to 60° C. until obtaining a homogenous/clear solution. Cast the clear solution onto magnesium alloy AZ31B-F with a native MgO surface (Isoelectric Point=12) and cure the resin at 160° C. for 4 hours.

The resulting casting released from the magnesium alloy.

Comparative Example 9

Apply 0.2 microns of $SiO_2$ (Isoelectric Point=2.0) film to float glass by PVD evaporation method.

Charge a flask with 22.2 g of isophorone diisocyanate (IPDI), 20 g of polycaprolactone triol (average MW=300 g/mol) and 0.22 g of ZELEC MR-1. Mix and heat the mixture to 60° C. until obtaining a homogenous/clear solution. Cast the clear solution onto the $SiO_2$ coated glass and cure the resin at 160° C. for 4 hours.

The resulting casting failed to release from the $SiO_2$ coated glass.

Comparative Example 10

Prepare glass substrates and apply trichloro fluoroalkyl silane using similar techniques as instructed by example 1 in U.S. Pat. No. 5,328,768 to Goodwin. Assemble a mold as shown in FIG. 14 using the prepared glass.

Charge a flask with 22.23 g of isophorone diisocyanate (IPDI), 8.0 g of polycaprolactone triol (average MW=300 g/mol) and 5.364 g of trimethanol propane. Mix and heat the mixture to 60° C. until obtaining a homogenous/clear solution. Cast the clear solution into the prepared mold and cure the resin at 160° C. for 4 hours.

Figure 19:
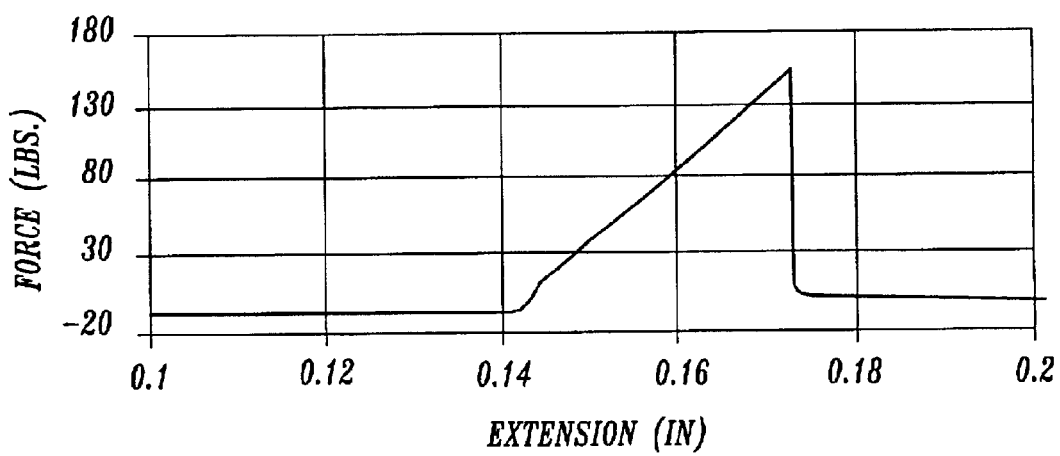
FIG. 19 shows a graphical representation of the pull force vs. displacement curve for Example 10.

FIG. 19 shows the pull-force vs. displacement curve. Release occurred as a gradual event at about 150 lbs (three times the force necessary to open example 2).

Comparative Example 11

Soak float glass substrates in a solution of 0.4% by weight Zonyl UR dissolved in a 60/40 DI water/isopropanol mixture for 30 minutes. Briefly rinse the residual solution from the treated glass with tap water and dry. Assemble the test mold as shown in FIG. 14. The fluorinated phosphate coated air-side of the glass substrate is the treated mold surface 612 shown in FIG. 14.

Charge a flask with 22.23 g of isophorone diisocyanate (IPDI), 8.0 g of polycaprolactone triol (average MW=300 g/mol) and 5.364 g of trimethanol propane. Mix and heat the mixture to 60° C. until obtaining a homogenous/clear solution. Cast the clear solution against the air-side of the prepared mold and cure the resin at 160° C. for 4 hours.

The resulting casting did not release from the mold.

Example 12

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Charge a flask with 22.23 g of isophorone diisocyanate (IPDI), 8.0 g of polycaprolactone triol (average MW=300 g/mol), 5.364 g of trimethanol propane and 0.2 g of ZELEC MR-1. Mix and heat the mixture to 60° C. until obtaining a homogenous/clear solution. Cast the clear solution into the prepared mold and cure the resin at 160° C. for 4 hours.

The resulting casting released from the alumina coated glass substrates.

Example 13

Apply 0.5 microns of $Al_2O_3$ film to a heated float glass substrate by PVD. Soak the $Al_2O_3$ treated mold face in a solution of 0.4% by weight Zonyl UR dissolved in a 60/40 DI water/isopropanol mixture for 30 minutes. Briefly rinse the residual Zonyl UR solution from the treated glass with tap water and dry. Assemble the test mold as shown in FIG. 1a. The Zonyl UR/alumina coated glass substrate is the treated mold surface 612 shown in FIG. 14.

Charge a flask with 22.23 g of isophorone diisocyanate (IPDI), 8.0 g of polycaprolactone triol (average MW=300 g/mol) and 5.364 g of trimethanol propane. Mix and heat the mixture to 60° C. until obtaining a homogenous/clear solution. Cast the clear solution into the prepared mold and cure the resin at 160° C. for 4 hours.

The resulting casting released from the alumina/Zonyl UR coated glass substrates.

Example 14

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Mix 0.5% by weight of octylphosphonic acid (OPA) from the Rhodia Company of Cranbury, N.J. to the polyol component of RP-6420 (RP-6420 is an optically clear thermosetting urethane material including of methylene bis (cyclohexylisocyanate), tetrahydroxypropyl ethylenediamine, and undisclosed polyether triols from the Vantico Company). Add an equal weight of RP-6420 isocyanate hardener to the polyol component (hardener to polyol ratio—1:1 by weight). Mix all components until obtaining a homogenous/clear solution. Pour the clear solution in the test mold and cure at 80° C. for 16 hours.

The resulting casting released from the alumina coated glass and not from the untreated glass.

Example 15

Apply 0.5 microns of $Al_2O_3$ film to a heated float glass substrate by PVD. Soak the $Al_2O_3$ treated mold face in a solution of 0.6% by weight OPA dissolved in a 60/40 DI water/acetone mixture for 30 minutes. Briefly rinse the residual OPA solution from the treated glass with tap water and dry. Assemble the test mold as shown in FIG. 14. The OPA/alumina coated glass substrate is the treated mold surface 612 shown in FIG. 14.

Mix RP-6420 polyol and RP-6420 hardener in equal quantities at room temperature until obtaining a homogenous/clear solution. Pour the clear solution in the test mold and cure at 80° C. for 16 hours.

The resulting casting released from the alumina coated glass and not from the untreated glass.

Comparative Example 16

Assemble an untreated test mold as shown in FIG. 14.

Mix 0.5% by weight of octylphosphonic acid to the polyol component of RP-6420. Add an equal weight of RP-6420 isocyanate hardener to the polyol component. Mix all components until obtaining a homogenous/clear solution. Pour the clear solution in the test mold and cure at 80° C. for 16 hours.

The resulting casting did not release from the untreated float glass mold.

Example 17

Apply 0.5 microns of $Al_2O_3$ film to a heated float glass substrate by PVD. Soak the $Al_2O_3$ treated mold face in a solution of 0.6% by weight OPA dissolved in a 60/40 DI water/acetone mixture for 1 hour 30 minutes. Briefly rinse the residual OPA solution from the treated glass with tap water and dry. Assemble the test mold as shown in FIG. 14. The OPA/alumina coated glass substrate is the treated mold surface 612 shown in FIG. 14.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold and cure at 160° C. for 4 hours.

The resulting casting released from the alumina coated glass and not from the untreated glass.

Example 18

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Charge a flask with 22.2 g of isophorone diisocyanate (IPDI), 20 g of polycaprolactone triol (average MW=300 g/mol) and 0.22 g of OPA. Mix and heat the mixture to 60° C. until obtaining a homogenous/clear solution. Pour the clear solution in the test mold and cure at 160° C. for 4 hours.

The resulting casting released from the alumina coated glass and not from the untreated glass.

Comparative Example 19

Assemble a mold using untreated float glass as shown in FIG. 14.

Charge a flask with 22.2 g of isophorone diisocyanate (IPDI), 20 g of polycaprolactone triol (average MW=300 g/mol) and 0.22 g of OPA. Mix and heat the mixture to 60° C. until obtaining a homogenous/clear solution. Pour the clear solution in the test mold and cure at 160° C. for 4 hours.

The resulting casting did not release from the untreated air-side of the float glass mold.

Epoxy Resin Castings:

Examples 20, 21 and 22 demonstrate the release process with epoxy resins. Example 22 demonstrates the disclosed release method with UV curable epoxy resin.

Example 20

Apply 0.5 microns of $Al_2O_3$ film to a heated float glass substrate by PVD. Soak the $Al_2O_3$ treated mold face in a solution of 0.6% by weight Fluowet PL80 (perfluorinated alkylphosphonic acid from the Clariant Company) dissolved in a 60/40 DI water/acetone mixture for 30 minutes. Briefly rinse the residual Fluowet solution from the treated glass with tap water and dry. Assemble the test mold as shown in FIG. 14. The Fluowet/alumina coated glass substrate is the treated mold surface 612 shown in FIG. 14.

Mix part A and part B of Hysol OS0100 Epoxy supplied by the Henkel KgaA Company (formerly provided by Dexter) of Düsseldorf, Germany in a 1:1 ratio at room temperature until obtaining a homogenous/clear solution. Pour the clear solution in the test mold and cure at 130° C. for 4 hours.

The resulting casting released from the alumina coated glass and not from the untreated glass.

Comparative Example 21

Apply 0.5 microns of $Al_2O_3$ film to a heated float glass substrate by PVD. Assemble the test mold as shown in FIG. 14. The alumina coated glass substrate is the treated mold surface 612 shown in FIG. 14.

Mix part A and part B of Hysol OS0100 Epoxy in a 1:1 ratio at room temperature until obtaining a homogenous/clear solution. Pour the clear solution in the test mold and cure at 130° C. for 4 hours.

The resulting casting failed to release from the alumina coated glass.

Example 22

Apply 0.2 microns of $TiO_2$ (Isoelectric Point=4.0) film to a silica glass microscope slide.

Mix 16 grams of Union Carbide Epoxy (Cyracure UVR 6128—consists of mixtures of bis(3,4 epoxy cyclohexylmethyl adipate) and 3,4 epoxy cyclohexylmethyl-3'-cyclohexenylmethyl adipate) and 4 grams of polycaprolactone triol (average MW=300 g/mol) until obtaining a clear solution. Add 0.8 g of Union Carbide Photoinitiator (Cyracure UVI-6992—consists of mixtures of triarylsulfonium and hexafluorophosphate salts) and 0.2 g of octyl phosphonic acid. Mix until the solution is clear.

Apply a few drops of the above solution to a urethane sheet. Slowly lower the $TiO_2$ coated slide on top of the drops of resin so as to laminate the coated glass to the plastic substrate. The resin will wet both the plastic and the coated glass under the weight of the microscope slide.

Cure the resin with long-wave UV light through the transparent microscope slight.

Following the cure cycle, the microscope slide releases from the hardened resin leaving a coating adhered to the urethane that replicates the fine surface features of the $TiO_2$ microscope slide.

Tin-Oxide Coated Glass:

The next series of examples demonstrate the use of EMRs used in conjunction with tin-oxide films on glass substrates.

Example 23

Soak an untreated mold face in a solution of 0.4% by weight Zonyl UR dissolved in a 60/40 DI water/isopropanol mixture for 30 minutes. Briefly rinse the residual Zonyl UR solution from the treated glass with tap water and dry. Assemble the test mold as shown in FIG. 14. The Zonyl UR/tin-side of uncoated float glass substrate is the treated mold surface 612 shown in FIG. 14.

Charge a flask with 22.2 g of isophorone diisocyanate (IPDI), and 20 g of polycaprolactone triol (average MW=300 g/mol). Mix and heat the mixture to 60° C. until obtaining a homogenous/clear solution. Pour the clear solution in the test mold against the tin-side of the mold plate and cure at 160° C. for 4 hours.

Release occurred at about 65 lbs.

Example 24

Soak an untreated mold face in a solution of 0.4% by weight Zonyl UR dissolved in a 60/40 DI water/isopropanol mixture for 30 minutes. Briefly rinse the residual Zonyl UR solution from the treated glass with tap water and dry. Assemble the test mold as shown in FIG. 14. The Zonyl UR/tin-side of uncoated float glass substrate is the treated mold surface 612 shown in FIG. 14.

Charge a flask with 22.23 g of isophorone diisocyanate (IPDI), 8.0 g of polycaprolactone triol (average MW=300 g/mol) and 5.364 g of trimethanol propane. Mix and heat the mixture to 60° C. until obtaining a homogenous/clear solution. Pour the clear solution in the test mold against the tin-side of the mold plate and cure at 160° C. for 4 hours.

Release occurs preferentially off of the tin-side float glass surface.

Comparative Example 25

Assemble an untreated test mold as shown in FIG. 14. The tin-side of uncoated float glass substrate is the mold surface 612 shown in FIG. 14.

Charge a flask with 22.23 g of isophorone diisocyanate (IPDI), 8.0 g of polycaprolactone triol (average MW=300 g/mol) and 5.364 g of trimethanol propane. Mix and heat the mixture to 60° C. until obtaining a homogenous/clear solution. Pour the clear solution in the test mold against the tin-side of the mold plate and cure at 160° C. for 4 hours.

The resin does not release from the mold surfaces. The mold breaks while attempting to open the mold.

Table 1 summarizes the results of the foregoing examples.

TABLE 1

| Example | Surface | IMR/EMR | Release Agent | Resin | Release Performance[1] |
|---|---|---|---|---|---|
| 1 | $Al_2O_3$ | IMR | ZELEC MR-1 | IPDI/Tone | O |
| 2 | $Al_2O_3$ | EMR | Zonyl UR | IPDI/Tone | O |
| 3 | Float Glass Air Side | None | None | IPDI/Tone | X |
| 4 | $Al_2O_3$ | None | None | IPDI/Tone | X |
| 5 | $Al_2O_3$ | IMR | Perfluorododacanoic Acid | IPDI/Tone | ▽ |
| 6 | $Al_2O_3$ | EMR | Perfluorododacanoic Acid | IPDI/Tone | ▽ |
| 7 | $TiO_2$ | IMR | ZELEC MR-1 | IPDI/Tone | O |
| 8 | MgO | IMR | ZELEC MR-1 | IPDI/Tone | O |

TABLE 1-continued

| Example | Surface | IMR/EMR | Release Agent | Resin | Release Performance[1] |
|---|---|---|---|---|---|
| 9 | $SiO_2$ | IMR | ZELEC MR-1 | IPDI/Tone | X |
| 11 | Float Glass Air Side | EMR | Zonyl UR | IPDI/Tone | X |
| 12 | $Al_2O_3$ | IMR | ZELEC MR-1 | IPDI/TMP/Tone | O |
| 13 | $Al_2O_3$ | EMR | Zonyl UR | IPDI/TMP/Tone | O |
| 14 | $Al_2O_3$ | IMR | OPA | Vantico Resin RP-6420 | O |
| 15 | $Al_2O_3$ | EMR | OPA | RP-6420 | O |
| 16 | Float Glass Air Side | IMR | OPA | RP-6420 | X |
| 17 | $Al_2O_3$ | EMR | OPA | IPDI/Tone | O |
| 18 | $Al_2O_3$ | IMR | OPA | IPDI/Tone | O |
| 19 | Float Glass Air Side | IMR | OPA | IPDI/Tone | X |
| 20 | $Al_2O_3$ | EMR | Fluowet PL80 | Hysol Epoxy OS0100 | O |
| 21 | $Al_2O_3$ | None | | Hysol Epoxy OS0100 | X |
| 22 | $TiO_2$ | IMR | OPA | Cyracure | O |
| | $Al_2O_3$ | EMR | Fluowet PL80 | IPDI/Tone | O |
| 23 | Float Glass Tin Side | EMR | Zonyl UR | IPDI/Tone | O |
| 24 | Float Glass Tin Side | EMR | Zonyl UR | IPDI/TMP/Tone | O |
| 25 | Float Glass Tin Side | None | | IPDI/TMP/Tone | X |

[1] O = Excellent Release
X = No Release
∇ = Moderate Release

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of fabricating a thermoset article from a mold, comprising:
   providing a mold having a metal oxide coating on at least one surface;
   treating the mold with a solution comprising an ionic release agent, wherein the solution has a pH that induces an attracting charge on the metal oxide surface, wherein said charge is opposite to the charge of the release agent to bond the release agent to the metal oxide surface;
   providing a thermoset resin mixture in the mold; and
   curing the resin mixture in the mold.

2. The method of claim 1, wherein the mold is a glass substrate comprising silica.

3. The method of claim 1, wherein the metal oxide is selected from the group consisting of transition metal oxides and ceramic oxides.

4. The method of claim 3, wherein the metal oxide is selected from the group consisting of $TiO_2$, $TiO$, $Ti_2O_3$, $Ti_3O_5$, $SnO$, $SnO_2$, $Al_2O_3$, $Al_2O$, $AlO$, $ZrO_2$, $Ta_2O_5$, $HfO_2$, $Y_2O_3$, $Nb_2O_4$, $Nb_2O_5$, $NiO$, $MgO$, $MgO_2$, $Fe_2O_3$, $Fe_2O_4$, $FeOOH$, $Fe(OH)_2$, $Cr_2O_3$, $CrO_2$, and $CrO_3$ or any combination thereof.

5. The method of claim 4, wherein the metal oxide is $Al_2O_3$.

6. The method of claim 4, wherein the metal oxide is NiO.

7. The method of claim 4, wherein the metal oxide is MgO.

8. The method of claim 4, wherein the metal oxide is $SnO_2$.

9. The method of claim 1, wherein the metal oxide coating is a thin metal oxide layer.

10. The method of claim 9, wherein the metal oxide is deposited on the mold by physical vapor deposition or chemical vapor deposition.

11. The method of claim 10, wherein the thickness of the thin metal oxide is about 1 to about 2000 nm.

12. The method of claim 1, wherein the metal oxide coating is formed by $O_2$ plasma or atmospheric oxidation.

13. The method of claim 1, wherein the metal oxide exhibits an isoelectric point greater than 2.

14. The method of claim 13, wherein the metal oxide exhibits an isoelectric point greater than or about equal to 4.

15. The method of claim 14, wherein the metal oxide exhibits an isoelectric point greater than or about equal to 8.

16. The method of claim 15, wherein the metal oxide exhibits an isoelectric point greater than or about equal to 10.

17. The method of claim 16, wherein the metal oxide exhibits an isoelectric point less than or about equal to 12.

18. The method of claim 1, wherein the metal oxide exhibits an isoelectric point from about 7 to about 12.5.

19. The method of claim 18, wherein the metal oxide is selected from the group consisting of $Fe_2O_3$, $Fe_3O_4$, $FeOOH$, and $Fe(OH)_2$ or any combination thereof.

20. The method of claim 1, wherein the metal oxide exhibits an isoelectric point from about 6 to about 7.

21. The method of claim 20, wherein the metal oxide is selected from the group consisting of $CrO_3$, $CrO_2$, and $Cr_2O_3$ or any combination thereof.

22. The method of claim 1 wherein the release agent is used as an internal release agent.

23. The method of claim 1, wherein the release agent is an anionic compound.

24. The method of claim 1, wherein the release agent is a compound with the following general formula:

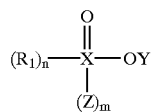

wherein,
- Y is any element or combination of elements that forms an acid conjugate upon dissociation,
- X is any element that facilitates the dissociation and formation of a base conjugate with reduced chemical interaction with the resin mixture,
- $R_1$ is any combination of elements that facilitates solubility within the resin mixture and provides a non-reactive barrier film,
- n is either 1 or 2,
- Z is either O or OH,
- m is either 0 or 1.

25. The method of claim 24, wherein,
- Y is H, $NH_4$, or $NR_4$, wherein R is any aliphatic hydrocarbon chain,
- X is P, S, or C,
- $R_1$ is any alkyl, alkyl ester, or fluorinated alkyl esters, $R_1$ having from 8 to 20 carbon units,
- n is 1 when X is C or S or when X is P and the compound describes phosphinic acid or di-acid phosphate esters, n is 2 when X is P and the compound describes phosphinic acid or mono-acid phosphate esters,
- Z is O when X is S and the compound describes sulfonic acids, Z is OH when X is P and the compound describes di-acid phosphate esters or phosphinic acids, and m is 1,
- m is 0 when X is C or X is P and the compound describes mono-acid phosphates or phosphinic acid.

26. The method of claim 1, wherein the release agent is an ester or acid selected from the group consisting of phosphates, phosphonates, phosphonites, sulfates, sulfites and carboxylates.

27. The method of claim 26, wherein the release agent is selected from the group consisting of monoacid phosphate esters, diacid phosphate esters, fluorinated monoacid phosphate esters, fluorinated diacid phosphate esters, perfluorododecanoic acid, octyl phosphinic acid, and perfluorinated alkyl phosphinic acid.

28. The method of claim 1, wherein the release agent is used as an external release agent.

29. The method of claim 1, wherein the resin mixture comprises an epoxy or an isocyanate.

30. The method of claim 1, wherein the resin mixture comprises a compound selected from the group consisting of isophorone diisocyanate, 1,6-hexamethylene diisocyanate, xylylene diisocyanate, bis (4-isocyanatocyclohexyl) methane, cyclohexane diisocyanates, toluene diisocyanate, tetramethylxylyene diisocyanate methylene bis (cyclohexylisocyanate), bis 3,4 epoxy cyclohexylmethyl adipate, 3,4 epoxy cyclohexylmethyl-3'-cyclohexenylmethyl adipate and diallyl diglycol carbonate.

31. A method of using a float glass mold having a $SnO_2$ surface, comprising:
  - treating the mold with a solution comprising an anionic release agent having a negative charge, wherein the solution has a pH that induces a positive charge on the $SnO_2$ surface to attract and to bond the release agent to the $SnO_2$ surface.

32. The method of claim 31, further comprising the step: providing a mold formed from the float glass.

33. The method of claim 31, further comprising the step: providing a urethane resin in the mold and curing the resin.

34. The method of claim 31, further comprising the step: providing an epoxy resin in the mold and curing the resin.

35. A method for making castings from oxide-coated molds, comprising:
  - treating a mold with a solution comprising a release agent, wherein the solution has a pH that induces an attracting force on an oxide surface of the mold to bond the release agent to the surface, and using said treated mold to shape curable resin to provide a casting from said treated mold.

36. A method for making articles cast from molds, comprising:
  - treating a mold having at least one oxide-coated surface with a solution comprising an ionic release agent having a charge, wherein the solution has a pH that induces the opposite charge on the oxide surface to bond the release agent to the surface;
  - providing resin in the mold; and
  - curing the resin.

* * * * *

UNITED STATES PATENT AND TRADEMARK OFFICE
CERTIFICATE OF CORRECTION

PATENT NO. : 6,783,719 B2
DATED : August 31, 2004
INVENTOR(S) : T.R. Robinson et al.

It is certified that error appears in the above-identified patent and that said Letters Patent is hereby corrected as shown below:

Title page,
Item [*] Notice, "408 days." should read -- 442 days. --
Item [56], References Cited, OTHER PUBLICATIONS, "Asher, William E.," reference, "adn" should read -- and --

Column 22,
Line 38, "about $_{2000}$ nm." should read -- about 2000 nm. --

Column 23,
Line 19, "Z is either 0" should read -- Z is either O --

Signed and Sealed this

Twenty-fifth Day of January, 2005

JON W. DUDAS
*Director of the United States Patent and Trademark Office*